US008801241B2

(12) United States Patent
Peck et al.

(10) Patent No.: US 8,801,241 B2
(45) Date of Patent: Aug. 12, 2014

(54) HIGH INTENSITY WARNING LIGHT WITH REFLECTOR AND LIGHT-EMITTING DIODES

(75) Inventors: John Patrick Peck, Manasquan, NJ (US); Sam Acacia, Staten Island, NY (US)

(73) Assignee: Dialight Corporation, Farmingdale, NJ (US)

( * ) Notice: Subject to any disclaimer, the term of this patent is extended or adjusted under 35 U.S.C. 154(b) by 168 days.

(21) Appl. No.: 13/440,427

(22) Filed: Apr. 5, 2012

(65) Prior Publication Data

US 2012/0257385 A1 Oct. 11, 2012

Related U.S. Application Data

(60) Provisional application No. 61/473,509, filed on Apr. 8, 2011, provisional application No. 61/474,001, filed on Apr. 11, 2011.

(51) Int. Cl.
*B64F 1/20* (2006.01)
*F21V 21/00* (2006.01)

(52) U.S. Cl.
USPC ....................... 362/470; 362/249.02; 362/238

(58) Field of Classification Search
USPC ............................ 362/249.02, 470, 225, 238
See application file for complete search history.

(56) References Cited

U.S. PATENT DOCUMENTS

| | | | | |
|---|---|---|---|---|
| 5,130,761 | A | 7/1992 | Tanaka | |
| 7,645,053 | B2 * | 1/2010 | Machi et al. | 362/241 |
| 7,794,110 | B2 * | 9/2010 | Hirni et al. | 362/241 |
| 7,862,206 | B2 * | 1/2011 | Chen et al. | 362/249.03 |
| 8,226,271 | B2 * | 7/2012 | Mo | 362/294 |
| 8,240,895 | B2 * | 8/2012 | Lin et al. | 362/418 |
| 2006/0198141 | A1 | 9/2006 | Peck et al. | |
| 2008/0049422 | A1 | 2/2008 | Trenchard et al. | |
| 2008/0089071 | A1 * | 4/2008 | Wang | 362/294 |
| 2009/0207605 | A1 | 8/2009 | Fields | |
| 2009/0213592 | A1 | 8/2009 | Zhang et al. | |
| 2010/0328960 | A1 | 12/2010 | Wang | |
| 2011/0044038 | A1 | 2/2011 | Mo | |

OTHER PUBLICATIONS

PCT Search Report and Written Opinion for International Patent Application Serial No. PCT/US12/32575, dated Sep. 20, 2012, consists of 11 unnumbered pages.

* cited by examiner

*Primary Examiner* — Peggy Neils

(57) ABSTRACT

The present invention is directed to a high intensity light module for warning aircraft of obstructions. In one embodiment, the high intensity light module for warning aircraft of obstructions includes a first plate, at least one reflector coupled to the first plate along a length of the first plate, a plurality of light emitting diodes (LEDs) coupled to the first plate, wherein the at least one reflector redirects light emitted by the plurality of LEDs substantially along a single side of the high intensity light module, a lens coupled around a perimeter of the first plate and a second plate coupled to the lens around a perimeter of the second plate and coupled to the first plate via one or more standoffs.

10 Claims, 13 Drawing Sheets

FIG. 7
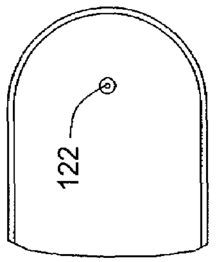
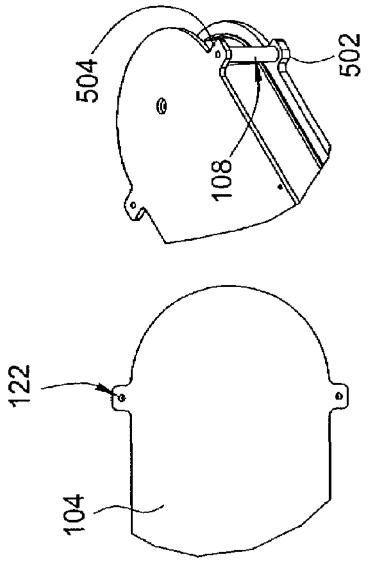
FIG. 6
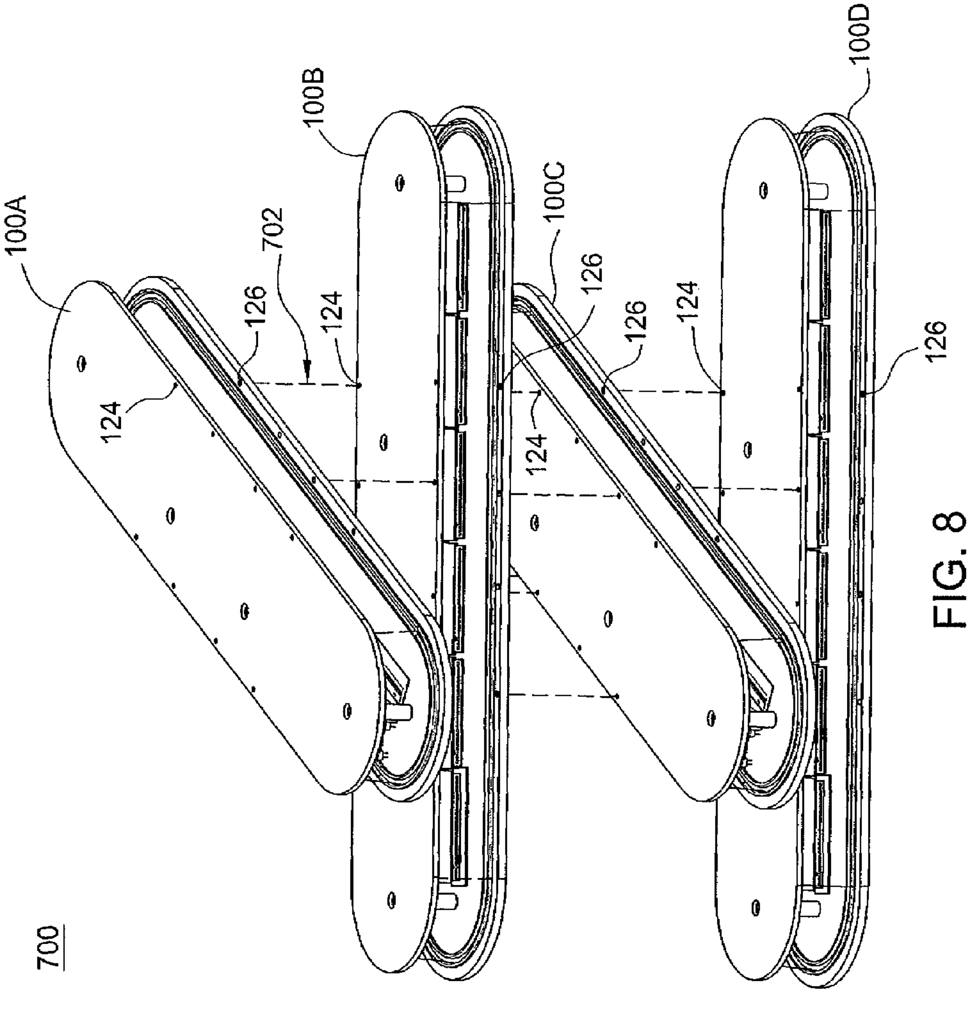
FIG. 8

HIGH INTENSITY WARNING LIGHT WITH REFLECTOR AND LIGHT-EMITTING DIODES

CROSS REFERENCE TO RELATED APPLICATIONS

This application claims priority under 35 U.S.C. §119(e) to U.S. provisional patent application Ser. Nos. 61/473,509, filed on Apr. 8, 2011 and 61/474,001, filed on Apr. 11, 2011, which are hereby incorporated by reference in their entirety.

BACKGROUND

High intensity lights can be used to mark a structure over 500 feet in height that may be a hazard to aircraft navigation. Current high intensity lights use Xenon bulbs and do not offer the reliability and extended life cycle of newer designs.

In addition, the design of the Xenon based high intensity lights does not provide consistent light intensity horizontally throughout a 360 degree coverage. For example, the Xenon based high intensity lights are typically enclosed in a single module. The single module is typically a square or rectangular box enclosure with a window on one side where most of the light is emitted directly forward. The single module may not emit sufficient light at wide angles in the horizontal axis and, therefore, may not provide sufficient light output at all angles. Multiple Xenon based high intensity lights are used together on a level of the tower; however, there may be gaps where insufficient light is emitted and, therefore, the lights may not be seen clearly by pilots.

Xenon bulbs also tend to have a relatively short life expectancy compared to newer light technologies. Due to the remote locations of many towers and the height of the towers, replacing the Xenon bulbs frequently can lead to high maintenance costs and replacement costs.

SUMMARY

In one embodiment, the present disclosure provides a high intensity light module for warning aircraft of obstructions. In one embodiment, the high intensity light module for warning aircraft of obstructions includes a first plate, at least one reflector coupled to the first plate along a length of the first plate, a plurality of light emitting diodes (LEDs) coupled to the first plate, wherein the at least one reflector redirects light emitted by the plurality of LEDs substantially along a single side of the high intensity light module, a lens coupled around a perimeter of the first plate and a second plate coupled to the lens around a perimeter of the second plate and coupled to the first plate via one or more standoffs.

In one embodiment, the present disclosure provides another embodiment of a high intensity light for warning aircraft of obstructions. In one embodiment, the high intensity light for warning aircraft of obstructions includes a first high intensity light module comprising a first plurality of light emitting diodes (LEDs) and a second high intensity light module comprising a second plurality of LEDs, wherein the second high intensity light module is stacked on top of the first high intensity light module, wherein a first optical axis of the first high intensity light module and a second optical axis of the second high intensity light module are angled to provide light emission at angles greater −90 degrees to +90 degrees in a horizontal axis, wherein the first high intensity light module and the second high intensity light module are parallel.

In one embodiment, the present disclosure provides a high intensity light system for warning aircraft of obstructions. In one embodiment, the high intensity light system for warning aircraft of obstructions includes a first high intensity light and at least a second high intensity light positioned relative to the first high intensity light to provide 360 degrees of total light output, wherein each one of the first high intensity light and the second high intensity light comprises a first high intensity light module and a second high intensity light module stacked on top of one another, wherein a first optical axis of the first high intensity light module and a second optical axis of the second high intensity light module are angled to provide light emission at angles greater −90 degrees to +90 degrees in a horizontal axis, wherein the first high intensity light module and the second high intensity light module are parallel.

BRIEF DESCRIPTION OF THE DRAWINGS

So that the manner in which the above recited features of the present invention can be understood in detail, a more particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 depicts one embodiment of a standoff mounting location;

FIG. 7 depicts another embodiment of a standoff mounting location;

FIG. 8 depicts an exploded view of a high intensity light with a plurality of high intensity light modules;

DETAILED DESCRIPTION

High structures, for example structures over 500 feet, are marked with high intensity aircraft obstruction warning lighting such that they are seen and avoided by aircraft navigation. The lighting generally attempts to provide radially outward 360 degree light coverage. In addition, the lighting must meet requirements set by various standards bodies depending on the geographic location, e.g., federal aviation administration (FAA), international civil aviation organization (ICAO), and the like.

However, as discussed above, current designs use Xenon based bulbs that have a relatively short life cycle. Due to the height of where the lighting is deployed, replacing the Xenon bulb can be expensive. In addition, the design of existing Xenon based high intensity aircraft obstruction warning lighting systems often do not provide sufficient light coverage that is even and consistent in a 360 degree radially outward distribution, even though multiple lights may be used together. This is, in part, a result of the use of a single module with a single Xenon bulb and a single reflector used within each light. The light emitting diode (LED) design discussed here uses two or more modules arranged at specified angles relative to each other. Multiple lights may be used together to achieve a more even and consistent light coverage in a 360 degree radially outward distribution in the horizontal axis.

Figure 1:
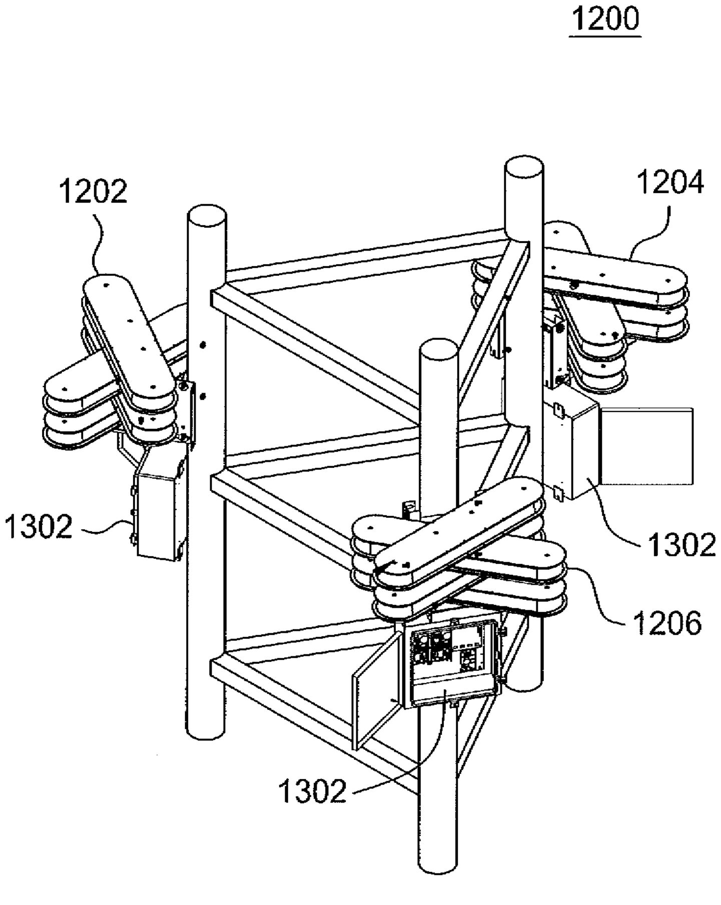
FIG. 1 depicts an isometric view of the high intensity light system as deployed on a tower.

Embodiments of the present disclosure resolve these issues by providing a high intensity light using a modular design that provides a more even and consistent light output in all directions of a 360 degree radially outward direction. One embodiment of the present disclosure is shown in FIG. 1 and discussed in further detail below. The high intensity light uses LEDs, which have a much longer life cycle than the Xenon based bulbs. As a result, the high intensity light of the present disclosure requires less maintenance and less replacement than the Xenon based bulbs, thereby, reducing overall operating costs associated with the high intensity light.

Figure 2:
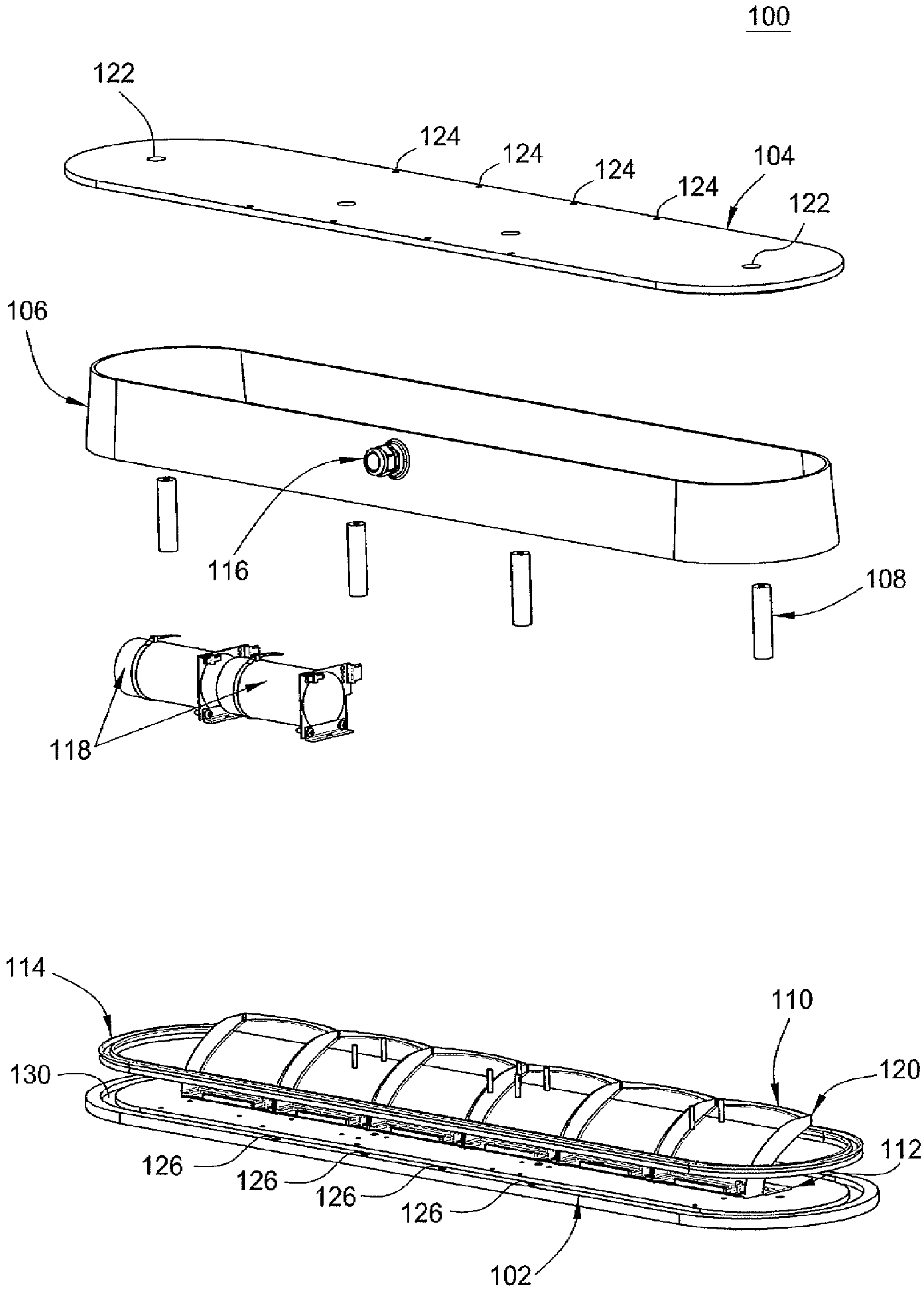
FIG. 2 depicts an exploded isometric view of one embodiment of a high intensity light module.

FIG. 2 illustrates an exploded isometric view of one embodiment of a high intensity light module 100. In one embodiment, the high intensity light module 100 includes a bottom plate 102, a top plate 104, a lens 106 and an LED optic 120. In one embodiment, the LED optic 120 may be coupled to the bottom plate 102 such that an optical axis of the LEDs may be pointed upward. The LEDs may be attached to the bottom plate 102. This may provide easy assembly and reduce LED light emission downward that could result in nuisance light to residential areas. In another embodiment, the LED optic 120 may be coupled to the top plate 104 such that an optical axis of the LEDs may be pointed downward. The LEDs are the primary source of heat and, therefore, attaching the LEDs to the top plate 104 may provide improved cooling by locating the heat source at the top of the high intensity light module 100.

In one embodiment, the bottom plate 102 may include a groove 130 that runs along a perimeter of the bottom plate 102. A gasket 114 may be placed in the groove 130. In one embodiment, the gasket 114 may be a continuous single piece fabricated from any material, such as for example, a polymer, a plastic, a rubber, and the like. In one embodiment, a continuous single piece may be fabricated by joining ends of a single long piece of gasket material. In one embodiment, the top plate 104 may also include the groove 130 that runs along a perimeter of the top plate 104. A gasket 114 may be placed in the groove 130 of the top plate 104. The lens 106 may be placed on top of the gasket 130 around the perimeter of the bottom plate 102. The gasket 114 of the top plate 104 may be placed on top of the lens 106 and the lens 106 may be pressed against the gasket 114 to form a liquid tight seal. The liquid tight seal may help prevent any moisture or debris from entering the high intensity light module 100. The lens 106 may have a draft angle and, therefore, the grooves 130 in the bottom plate 102 and the top plate 104 may have different dimensions. For example, a length of the groove 130 of the top plate 104 may be different than a length of the groove 130 of the bottom plate 102. In one embodiment, the length of the groove 130 of the top plate 104 is greater than a length of the groove 130 of the bottom plate 102. In one embodiment, the length of the groove 130 of the bottom plate 102 is greater than a length of the groove 130 of the top plate 104.

In one embodiment, the lens 106 may be a single piece and provide a continuous seal around the horizontal portion of the enclosure. In other words, the lens 106 may provide a continuous wall that curves or wraps around the high intensity light module 100 and provides a continuous seal around the high intensity light module 100. In one embodiment, the lens 106 may be clear and provide visibility into all sides of the high intensity light module 100. For example, the lens 106 may be a transparent light cover. In other words, the lens 106 may have no optical features or optics built in.

Having a continuous and optically clear lens around the module 100 allows light to exit the module 100 at wider angles in the horizontal axis than an enclosure with a square or rectangular box enclosure with a window on one side. For example, each high intensity light module 100 may emit light from −90 to +90 degrees in the horizontal axis. Arranging two or more high intensity light modules 100 at 20 degrees apart or more in the horizontal axis results in light emission at angles greater than −90 to +90 degrees in the horizontal axis. In one embodiment, —90 to +90 degrees may be with respect to an optical axis of the high intensity light module 100 being at 0 degrees. Said another way, greater than −90 to +90 degrees may also be defined as greater than 180 degrees.

Furthermore, the continuous seal provided by the gasket 114 between the lens 106, the bottom plate 102 and the top plate 104 results in an improved water ingress protection compared to a square or rectangular box enclosure with a window on one side. For example, the window may need to be glued and the square or rectangular box enclosure would require an additional opening. The opening could create a path for water ingress. Consequently, the square or rectangular box would also require a sealing mechanism for assembly and servicing, which could create further water ingress paths.

Figure 11:
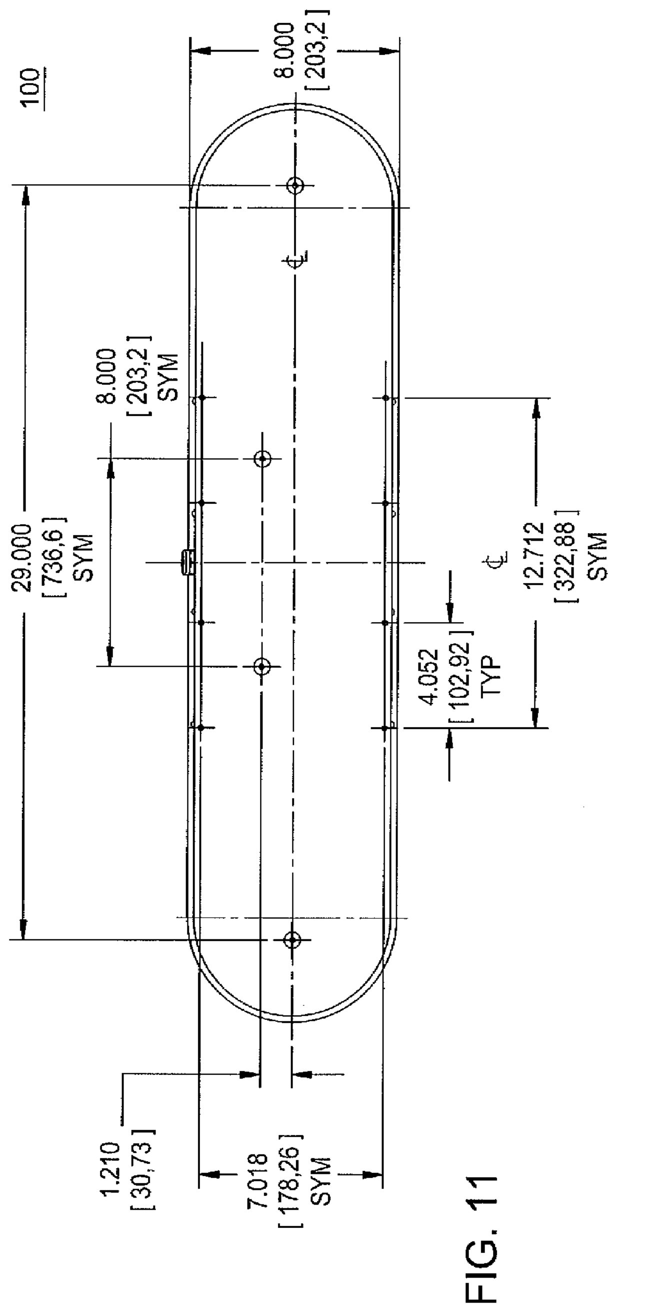
FIG. 11 depicts top view of one embodiment of the dimensions of the high intensity light module.
Figure 12:
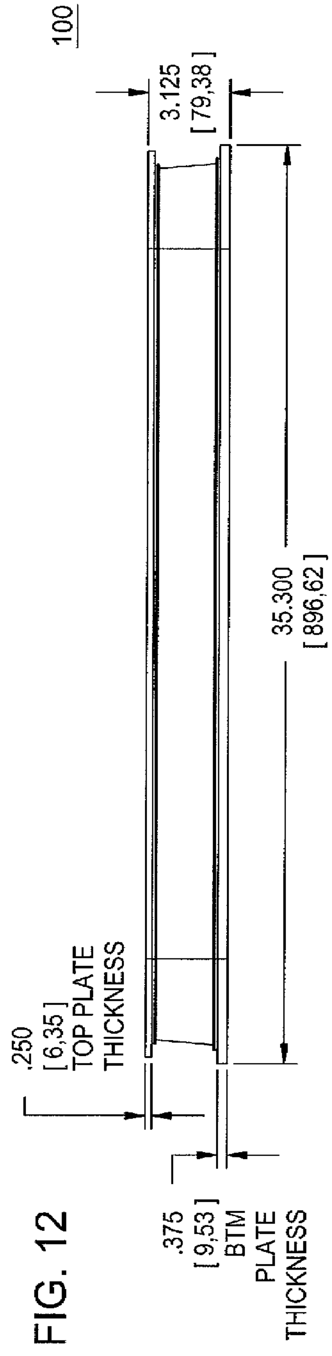
FIG. 12 depicts a side view of one embodiment of the dimensions of the high intensity light module.

In one embodiment, the bottom plate 102 and the top plate 104 may have a similar shape or even a same shape. In one embodiment, the shape may have a long length relative to a width. In one embodiment, the length is at least three times the width. In addition, the high intensity light module 100 may have a low profile, e.g., less than 5 inches. In one embodiment, the ratio of the length to the width may be at least approximately three to one. One example of possible dimensions of the high intensity light module 100 is illustrated in FIGS. 11 and 12 and discussed in further detail below.

In one embodiment, the bottom plate 102 and the top plate 104 are substantially flat. In other words, the bottom plate 102 and the top plate 104 have substantially no curves along the length of the bottom plate 102 and the top plate 104 and have no features protruding outward from the bottom plate 102 or from the top plate 104. Maintaining flatness and a parallel relationship between the bottom plate 102 and the top plate 104 is one advantageous feature of the high intensity light module 100. In one embodiment, the term parallel when referring to stacked high intensity light modules 100 may be defined as the high intensity light modules being parallel in the horizontal plane. In one embodiment, the bottom plate 102 and the top plate 104 are parallel to within +/−1 degree.

As will be discussed below, the high intensity light module 100 may be stacked on top of other high intensity light modules. As a result, if the bottom plate 102 and the top plate 104 are not substantially flat and substantially parallel with respect to each other, as the high intensity light modules are stacked on top of one another, the overall light distribution of each high intensity light module 100 will not be parallel with respect to each other. In other words, a bottom plate 102 of a first high intensity light module would be parallel to the top plate 104 of a second high intensity light module. This would cause unwanted spreading of the light intensity in the vertical axis.

Coupling the high intensity light modules 100 directly on top of one another, as compared to coupling them indirectly through additional mechanical brackets, can help maintain the parallel relationship between each of the high intensity light modules 100 in the vertical axis. For example, coupling each high intensity light module 100 to a common bracket may introduce an angular error that is inherent in the bracket that would lead to undesirable spreading of light in a vertical axis.

In one embodiment, the top plate 104 may be coupled to the bottom plate 102 holding the lens 106 in place via one or more standoffs 108. One or more openings 122 in the top plate 104 and the bottom plate 102 may be used to couple the top plate 104 and the bottom plate 102 together via the one or more standoffs 108. In other words, the one or more openings 122 of the top plate 104 may correspond to the one or more openings 122 of the bottom plate 102 such that the standoff 108 may be placed between the openings 122 and coupled via a fastener, e.g., a threaded screw, a nut and bolt, a clip, and the like.

In one embodiment, the one or more standoffs 108 are placed around the perimeter of the bottom plate 102 and the top plate 104 outside of the lens 106. This is illustrated in further detail in FIG. 6. FIG. 6 illustrates the bottom plate 102 and the top plate 104 having tab members 502 and 504 that extend away from the respective plate. The one or more standoffs 108 may be placed between the tab members 502 and 504 and to couple the bottom plate 102 and the top plate 104 together via one or more fasteners, e.g., a threaded screw, a nut and bolt, a clip, and the like.

Having the one or more standoffs 108 outside of the lens 106 and around a perimeter of the bottom plate 102 and the top plate 104 improves the parallelism of the bottom plate 102 and the top plate 104. In addition, the one or more standoffs 108 are not in the way of other electrical components within the high intensity light module 100. This frees limited space inside the high intensity light module 100 and allows for more symmetric and even placement of other electrical components within the high intensity light module 100. In another embodiment, the one or more standoffs 108 may be placed within the high intensity light module 100, e.g., near the center and/or at the ends as illustrated by the positioning of the opening 122 for the standoff 108 in FIG. 7.

The bottom plate 102 and the top plate 104 may also include one or more openings 126 and 124, respectively. As noted above, multiple high intensity light modules 100 may be stacked on top of one another to achieve the proper total light output and directional coverage. As a result, the one or more openings 124 and 126 provide different locations and angles to which the multiple high intensity light modules 100 may be coupled together. How the high intensity light modules 100 are coupled together and at what angles are discussed in further detail below.

In one embodiment, the LED optic 120 may include a reflector 110 and one or more LEDs 112. In another embodiment, the LED optic 120 may use an optical element instead of the reflector 110. For example, the optical element may be an optic that collimates light emitted by the one or more LEDs 112 in a vertical axis.

In one embodiment, the high intensity light module 100 may include a plurality of LED optics 120 arranged in a linear, or approximately linear, fashion along a length of the high intensity light module 100. In other words, the high intensity light module 100 may have a line of a plurality of reflectors 110 and a plurality of LEDs 112.

In one embodiment, the LED optic 120 may be arranged such that light emitted from the one or more LEDs 112 is redirected by the reflector 110 or an optical element and directed in substantially a single direction or out a single side along the length of the high intensity light module 100. Along a single side may be also defined as redirecting light within a range of −90 degrees to +90 degrees in a horizontal axis as opposed to 360 degrees all around. The length may be defined as a side with the longest dimension.

In one embodiment, the LEDs 112 may be high intensity LEDs capable of outputting at least 250 lumens. The combined light output of the high intensity light module 100 may be at least 100,000 candelas.

Figure 3:
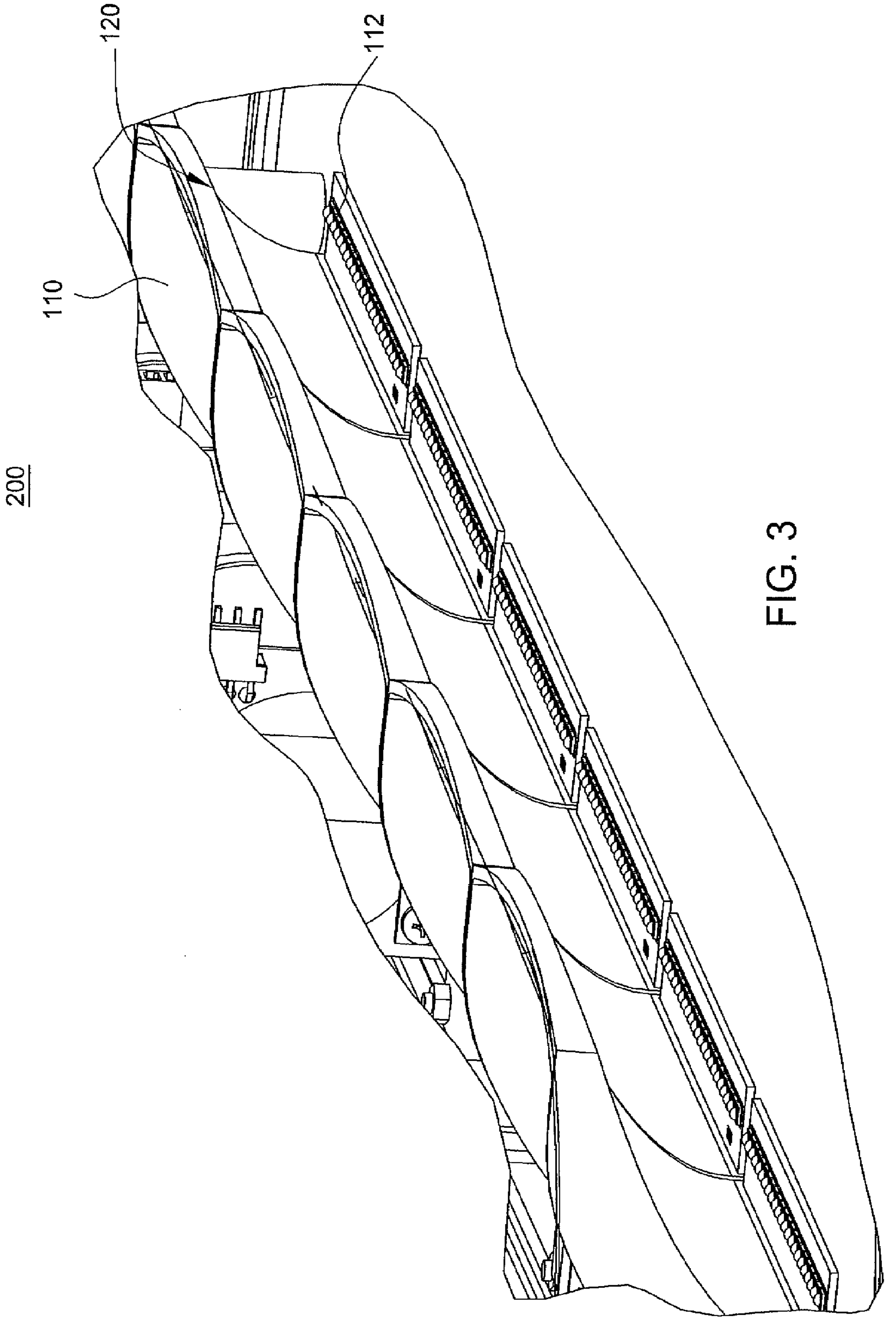
FIG. 3 depicts an isometric view of one embodiment of an LED optic assembly.
Figure 4:
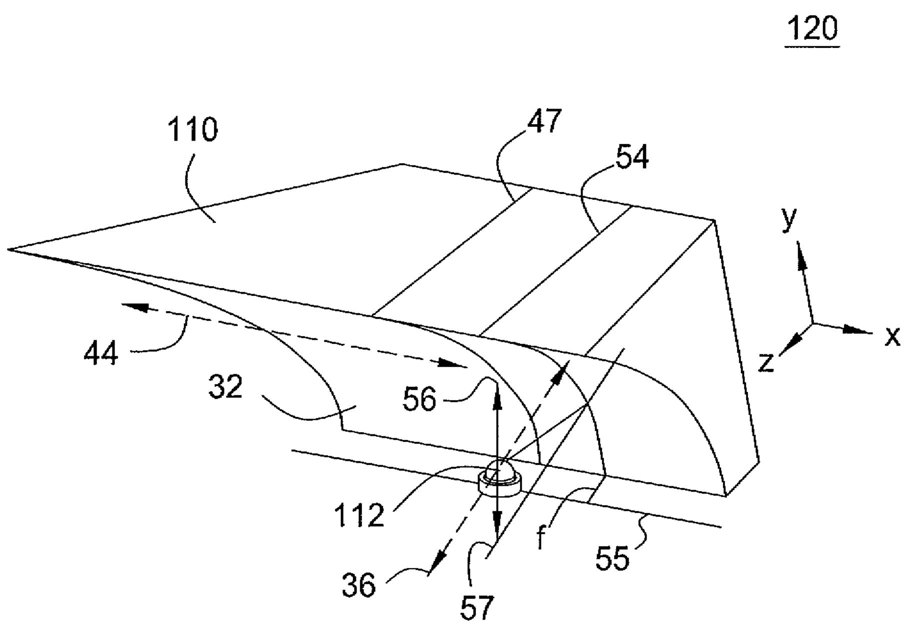
FIG. 4 depicts a detailed view of a reflector of the LED optic assembly.
Figure 5:
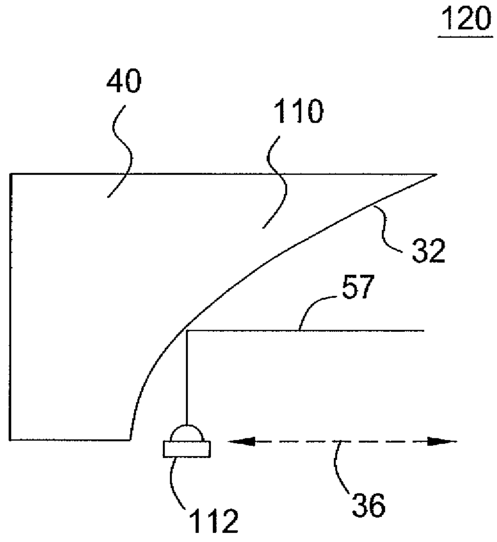
FIG. 5 depicts a cross-sectional view of the reflector.

FIGS. 3-5 illustrate more detailed views of the LED optic 120. FIG. 3 illustrates an isometric view of one embodiment of the LED optic 120. In one embodiment, the high intensity light module 100 may include a plurality of LED optics 120. Each one of the plurality of LED optics 120 may include a reflector 110 and a plurality LEDs 112. The plurality of LEDs 112 may consist of white LEDs. The plurality of LEDs 112 may consist of colored LEDs such as, for example, red LEDs. In one embodiment, the plurality of LEDs 112 may include white and colored LEDs. In one embodiment, the high intensity light module 100 contains a plurality of LEDs 112 that are white as well as a plurality of LEDs 112 that are colored. As a result, the high intensity light module 100 may be capable of providing a white output mode as well as a red light output mode. For example, a white output may be used during the day and red output may be used at night.

In one embodiment, white and colored LEDs may be coupled to a common circuit board. In one embodiment, light emitted by the red LEDs and light emitted by the white LEDs exits the high intensity light module 100 in approximately the same direction and has approximately the same beam spread.

The reflector 110 may have a linear extrusion axis and a conic or a parabolic curved cross section. The reflector 110 may have a curved cross section that is concave with respect to the one or more LEDs 112. Each one of the plurality of LEDs 112 may be placed at, or very near to, a focal distance relative to the reflector 110. As a result, light emitted from each one of the plurality of LEDs 112 that is redirected by the reflector 110 is highly collimated in a vertical direction, but not necessarily in the horizontal direction.

In one embodiment, the reflector 110 collimates the light from each one of the plurality of LEDs 112 such that the vertical beam spread of light emitted from each one of the plurality of LEDs 112 in the vertical axis is less than one tenth ($1/10^{th}$) the horizontal beam spread in the horizontal axis. For example, if the horizontal beam spread in the horizontal axis was a total of 180 degrees, the vertical beam spread in the vertical axis would be less than 18 degrees.

In one embodiment, the distance between the first and last LED 112 within the high intensity light module 100 may be long with respect to the size of the LED 112. In one embodiment, the plurality of LEDs 112 may be arranged along a line, or generally along a line, and the distance between the two furthest LEDs 112 in the line within the high intensity light module 100 may be at least 500 times the width of the light emitting semiconductor die within a single LED 112.

FIG. 4 illustrates a more detailed view of an embodiment of the reflector 110 and an LED 112 having an LED optical axis 56. The increased collimation provided by an array of LEDs 112 and the reflector 110, in comparison to reflectors that are revolved, rounded or circular, can also be better understood in reference to FIG. 4. Generally speaking, a parabolic reflector, for example, receives light originating from its focal distance (e.g., labeled "f" in FIG. 4) and reflects the light parallel to an optical axis 36 of the reflector 110. Herein, the "optical axis" may be considered to be a direction along which emitted light intensity is greatest. If the reflector 110 has the cross-section 40 (as illustrated in FIG. 5) projected along the linear extrusion axis 44, as in the embodiment of the reflector 110 depicted in FIG. 4, then the parabolic system is lost only in the horizontal direction and is conserved in the vertical direction and the light will be collimated vertically, as illustrated by an example ray trace 57.

For example, considering light comprising vector components in the x, y and z directions depicted in FIG. 4, line 55 demarks the focal length f for the vector component of light traveling in the y direction, and line 55 is common to the entire length of the reflector 110. Therefore, the vector component of light emitted by each one of the LEDs 112 in the y direction strikes both plane 54 and plane 47 as arriving from the focal length.

By comparison, if the reflector is revolved, i.e., having the cross-section projected along the curved trajectory, then the parabolic system may be reduced, or lost, in both the horizontal and vertical directions. Thus, the embodiment of the reflector 110 having the projection of the cross-section 40 (as shown in FIG. 5) of the reflecting surface 32 along the linear extrusion axis 44 provides increased collimation of reflected light in comparison to a curved or circular reflector.

FIG. 5 illustrates a cross-sectional view of one embodiment of the LED optic 120. FIG. 5 illustrates the example ray trace 57 from the LED 112 and being reflected by the reflector 110, as discussed above, being highly collimated.

Referring back to FIG. 2, in one embodiment, the high intensity light module 100 may also include a strain relief opening 116. The strain relief opening 116 provides a passageway for electrical connections to be made to internal components of the high intensity light module 100. For example, communication connections and/or power connections to a remote power supply may be made via the strain relief opening 116.

In one embodiment, the strain relief opening 116 may be sealed, e.g., with a gasket, to prevent moisture from entering the high intensity light module 100 through the strain relief opening 116. Although only a single strain relief opening 116 is illustrated, it should be noted that any number of openings may be used. However, it should be noted that fewer openings may be preferable to reduce the number of possible leak paths into the high intensity light module 100. In addition, although the strain relief opening 116 is illustrated as being on a side, the strain relief opening 116 may be located on the bottom plate 102 and/or the top plate 104.

In one embodiment, the high intensity light module 100 may also include other electrical components 118 required for proper operation, such as for example, capacitor boards, LED drivers, printed circuit boards, micro/communication boards, and the like. The electrical components 118 may be used to turn the one or more LEDs 112 on and off in order to flash the one or more LEDs 112 in a strobe mode. The electrical components 118 may also be used to regulate the current level to the one or more LEDs 112. FIG. 2 has been simplified for ease of understanding.

As noted above, the high intensity light module 100 may be stacked on top of other modules to form a high intensity light. FIG. 8 illustrates an exploded view of one embodiment of a high intensity light 700 comprising four high intensity light modules 100A-100D (also referred to collectively as "high intensity light modules 100"). Although four high intensity light modules 100 are illustrated as an example in FIG. 8, it should be noted that any number of high intensity light modules 100 may be used. For example, as the efficiency of each individual LED 112 becomes greater, the number of high intensity light modules 100 required to meet the light output requirements from a standards body may be reduced. Alternatively, if the light output requirements are increased or decreased then high intensity light modules 100 may be added or removed. In other words, depending on the application the amount of light output required may vary, thus, the number of high intensity light modules 100 that are used may also vary. In one embodiment, the high intensity light 700 may provide a total light output of at least 100,000 candelas.

Figure 19:
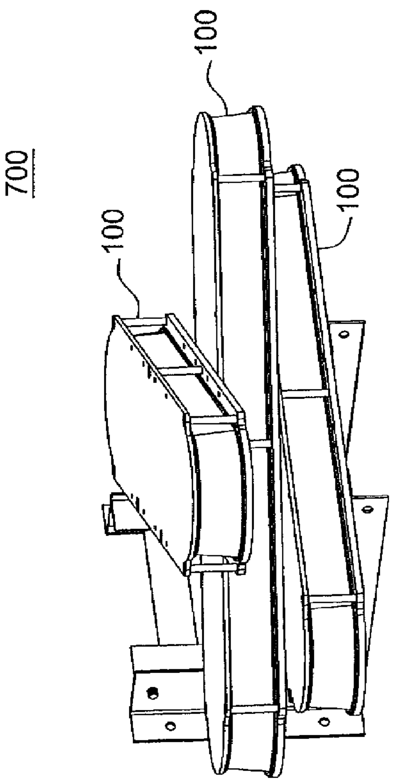
FIG. 19 depicts an isometric side view of the three high intensity light modules in the stacked configuration.
Figure 18:
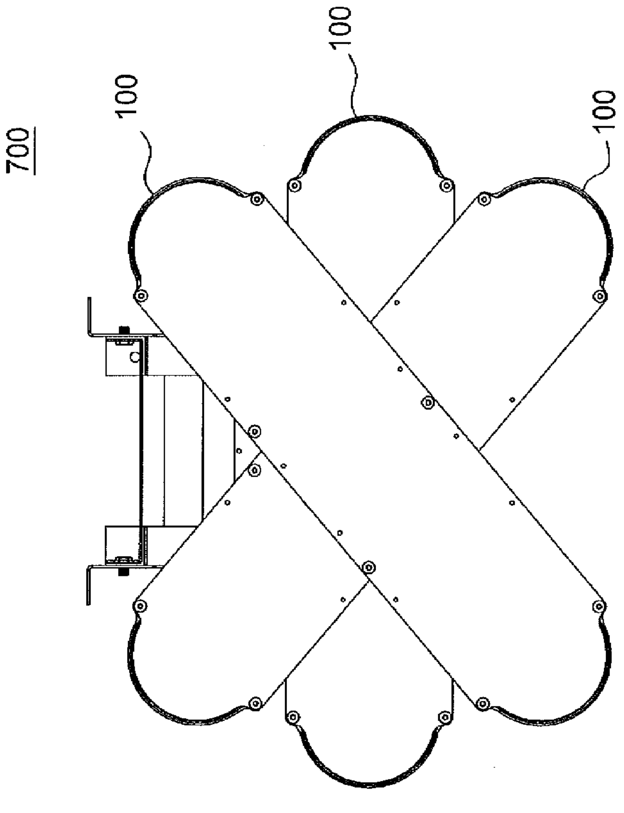
FIG. 18, depicts a top view of one embodiment of three high intensity light modules in a stacked configuration.
Figure 20:
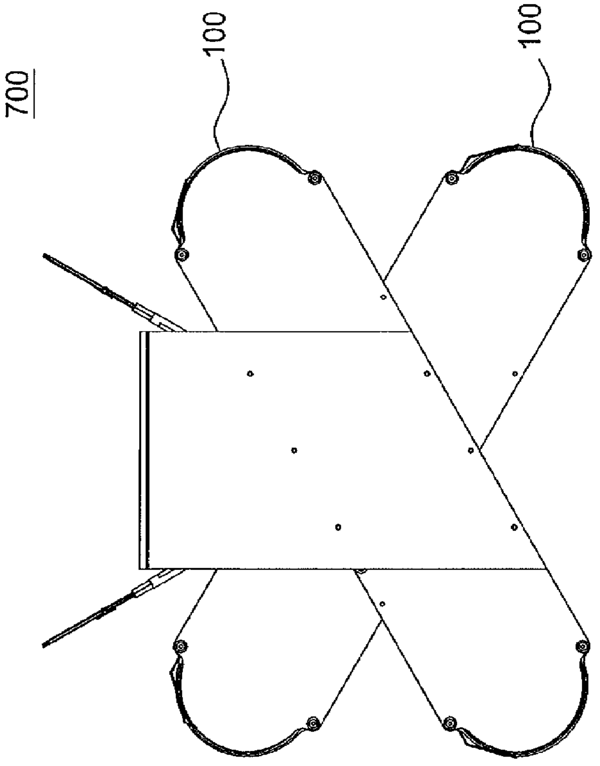
FIG. 20 depicts a top view of one embodiment of two high intensity light modules in a stacked configuration.
Figure 21:
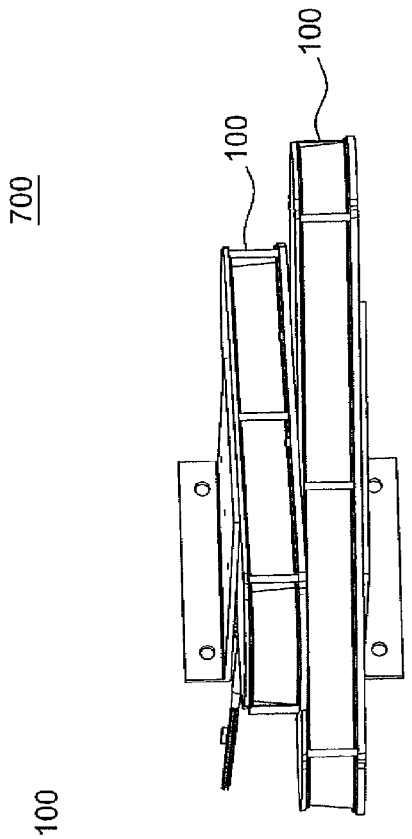
FIG. 21 depicts an isometric side view of the two high intensity light modules in the stacked configuration.

FIGS. 18 and 19 illustrate an embodiment of the high intensity light 700 with three high intensity light modules 100. FIGS. 20 and 21 illustrate an embodiment of the high intensity light 700 with two high intensity light modules 100.

In one embodiment, the high intensity light modules 100 are stacked on top of one another by aligning an opening 126 of a bottom plate of one high intensity light module 100 (e.g., high intensity light module 100A) to an opening 124 of a top plate of another high intensity light module 100 (e.g., high intensity light module 100B). This is illustrated in FIG. 8 by dashed lines 702. As discussed above in one embodiment, the high intensity light modules 100 may each have a plurality of openings 124 on each side of a top plate and a plurality of openings 126 on each side of a bottom plate. Thus, having multiple openings 124 and multiple openings 126 at different locations along each side of the top plate 104 and bottom plate 102, respectively, allows for various configurations with respect to what angles the high intensity light modules 100 can be arranged or stacked with respect to one another.

Figure 16:
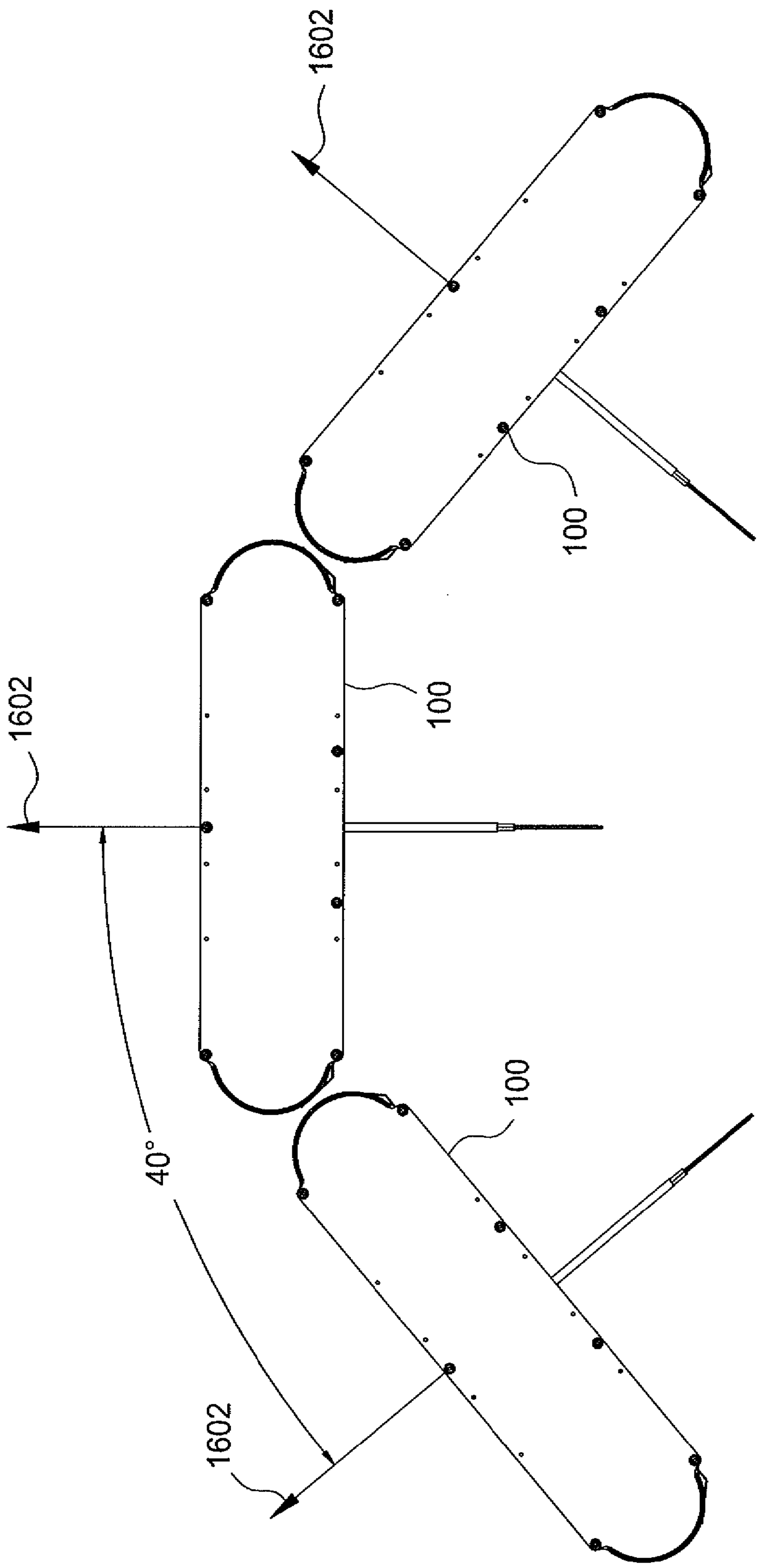
FIG. 16 depicts a top view of one embodiment of placing high intensity light modules adjacent to one another.
Figure 17:
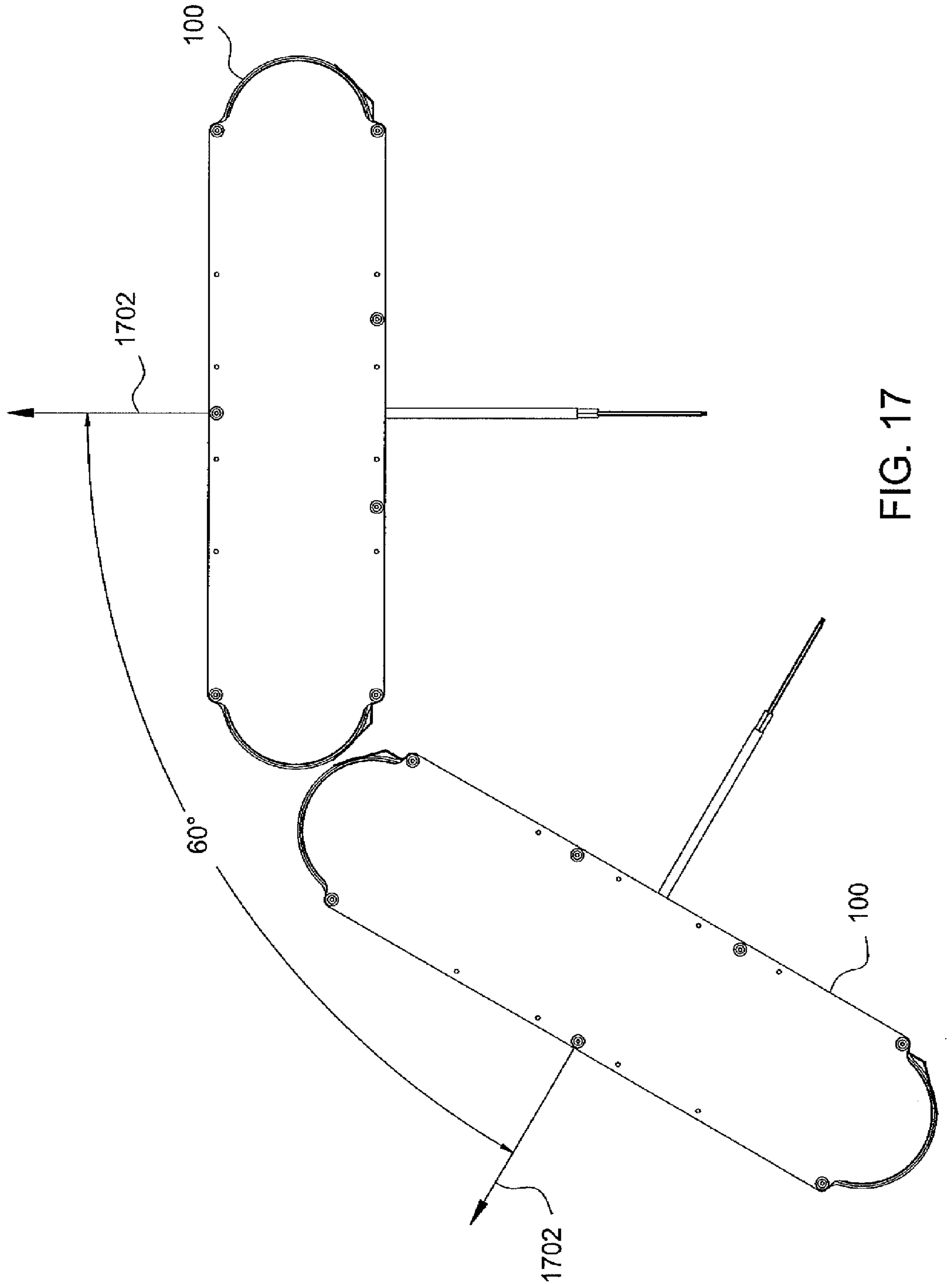
FIG. 17 depicts a top view of another embodiment of placing high intensity light modules adjacent to one another.

In an alternate embodiment, as shown in FIGS. 16 and 17, the high intensity light modules 100 may be positioned adjacent to each other. For example, FIG. 16 illustrates the high intensity light modules 100 positioned adjacent to each other such that an optical axis 1602 of each one of the high intensity light modules 100 are at an approximately 40 degree angle. In another example, FIG. 17 illustrates the high intensity light modules 100 positioned adjacent to each other such that an optical axis 1702 of each one of the high intensity light modules 100 are at an approximately 60 degree angle.

In one embodiment, the high intensity light modules 100 may be coupled to one another via a fastener placed through mated openings 124 and 126. The fastener may be any type of fastener, for example, a threaded screw, a nut and bolt combination, a clip and the like.

In one embodiment, the high intensity light modules 100 are stacked such that there is an air gap between each of the high intensity light modules 100. In one embodiment, a mechanical spacer may be used between the high intensity light modules 100 to create an air gap. The air gap may provide additional cooling by allowing air to pass between the high intensity light modules 100. In another embodiment, the high intensity light modules 100 may be flush mounted or mounted on top of one another such that they are in direct contact.

Although FIG. 8 illustrates that the high intensity light modules 100A and 100C are positioned at the same or approximately the same angles and that the high intensity light modules 100B and 100D are positioned at the same or approximately the same angles, it should be noted that other patterns may be used. For example, each one of the high intensity light modules 100A-100D may be stacked on top of one another at different angles horizontally and/or vertically to achieve specific desired light outputs.

Figure 9:
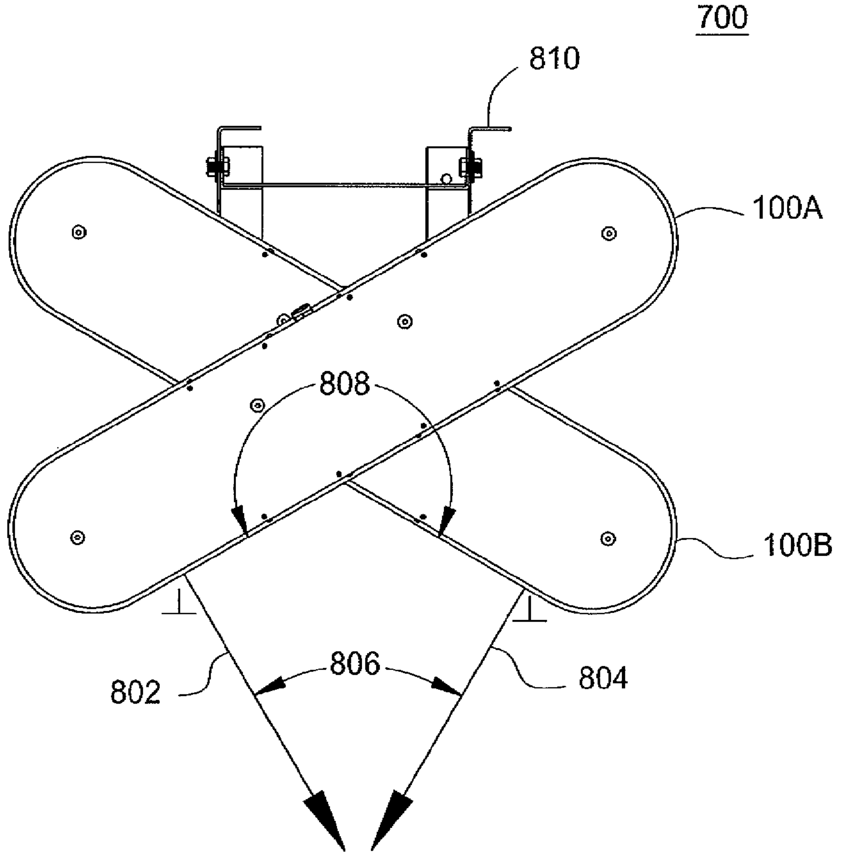
FIG. 9 depicts a top view of the high intensity light assembled.

FIG. 9 illustrates a top view of one embodiment of the high intensity light 700 and how the angles are measured. Each one of the high intensity light modules 100A-100D may be associated with an optical axis. FIG. 9 illustrates the top two high intensity light modules 100A and 100B and their respective optical axes 802 and 804. In one embodiment, the angle may refer to an angle 806 created by the intersection of the optical axes 802 and 804. In one embodiment, the angle 806 may be approximately 60 degrees. In one embodiment, the angle 806 may be between 40 and 80 degrees. However, the angle 806 may be any angle as required based upon the application, the number of high intensity light modules 100 and the requirements of the high intensity light 700 and the necessary light beam overlap to achieve the correct total light output. For example, the angle 806 may be approximately 40 degrees. An angle of 40 degrees may be preferred, for example, if three high intensity light modules 100 are used per high intensity light 700 as shown in FIGS. 18 and 19. A total of three high intensity light modules 100 and, therefore, a total of nine high intensity light modules, would provide 360 degrees of light intensity coverage. In a further embodiment, two lights may be used to provide 360 degree coverage. For example, each of the two lights may emit sufficient light intensity from −90 degrees to +90 degrees.

Having the angle 806 at approximately 60 degrees provides for light coverage of approximately 120 degrees. As a result, combining two or more additional high intensity lights 700 allows for light coverage in all directions of approximately 360 degrees radially outward. This is illustrated and discussed in further detail below with reference to FIGS. 13 and 1. In another embodiment, the angle may be measured by an angle 808 formed by the intersection of the perimeters of the high intensity light module 100A and the high intensity light module 100B, as illustrated in FIG. 9.

FIG. 9 also illustrates a mounting bracket 810 used to mount the high intensity light 700 to a pole, a tower or an obstruction. The mounting bracket 810 may be designed so that the angle of the horizontal beam can be adjusted if necessary, for example, by slotting one end of the mounting bracket 810. The vertical angle of the high intensity warning light may be adjusted with the use of the slots and additional hardware such as nuts and bolts. In one embodiment, the mounting bracket 810 may have an “L” shape to connect to a bottom one of the high intensity light modules 100 and to the pole or the obstruction.

Figure 14:
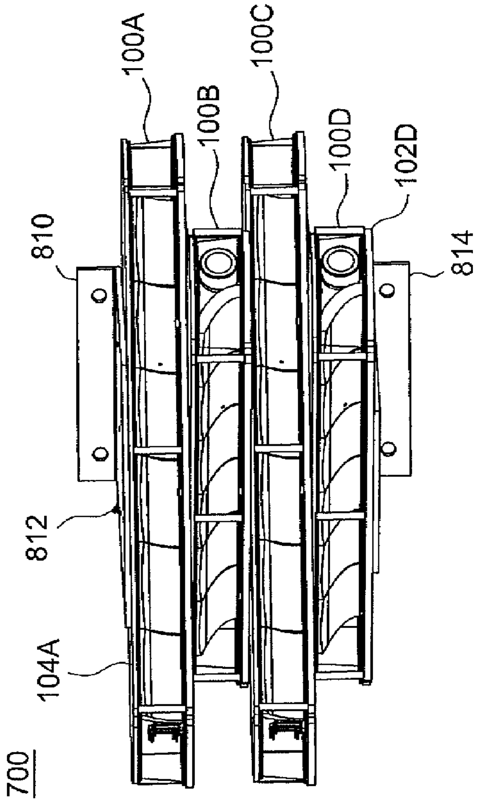
FIG. 14 depicts a side view of one embodiment of a mounting bracket holding four high intensity light modules.

In one embodiment, FIG. 14 illustrates the mounting bracket 810. In one embodiment, the mounting bracket 810 may have a first arm 812 and a second arm 814. The first arm 812 and the second arm 814 may be approximately parallel. The first arm 812 may be coupled to the top plate 104A of the top high intensity light module 100A and the second arm 814 may be coupled to the bottom plate 102D of the bottom high intensity light module 100D. As a result, all of the high intensity light modules 100A-100D are coupled to either another high intensity light module or one of the arms 812 or

Figure 15:
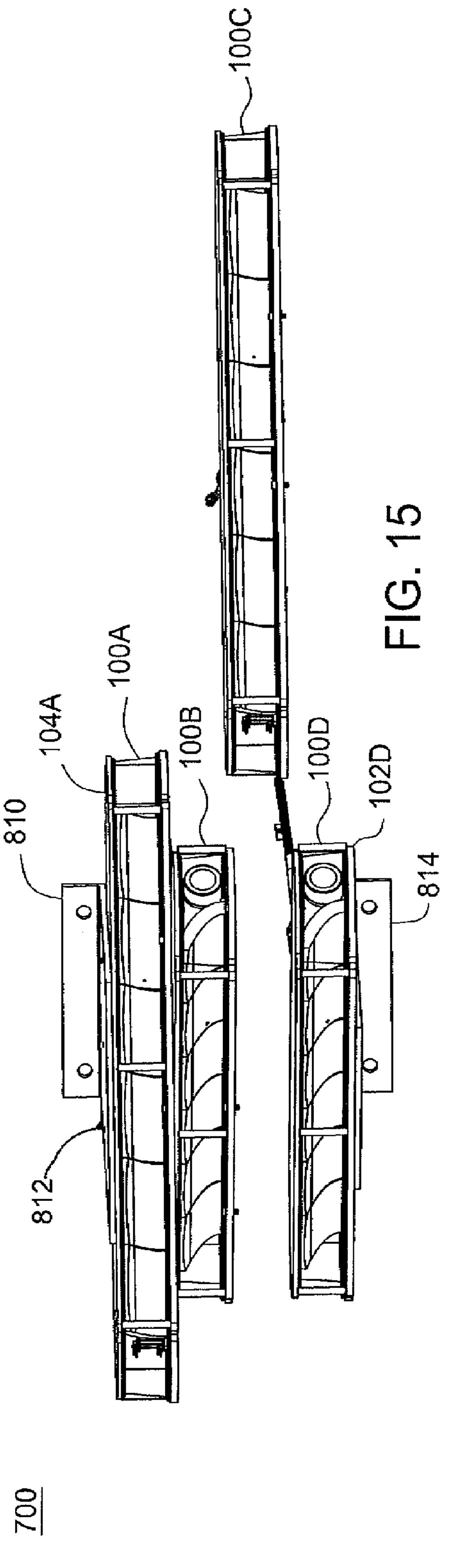
FIG. 15 depicts a side view of one embodiment of removing one of the four high intensity light modules.

814 of the mounting bracket 810. This allows for easy removal of individual high intensity light modules 100A-100D when the high intensity light 700 is mounted to the tower. For example, the high intensity light module 100C in the middle can be removed and replaced without taking the entire high intensity light 700 (i.e., all four high intensity light modules 100A-100D) off of the tower as illustrated in FIG. 15.

Figure 10:
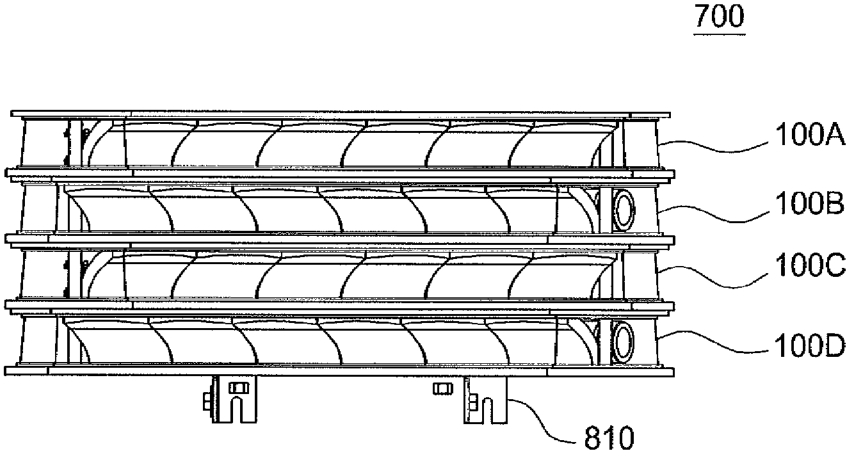
FIG. 10 depicts a side view of the high intensity light assembled.

FIG. 10 illustrates a side view of one embodiment of the high intensity light 700. As can be seen in FIG. 10, the design of the high intensity light modules 100 provides a very low profile design. As result, the high intensity light 700 may have a reduced weight and lower wind loading. In addition, the modular design provides for easy replacement of a single light weight module should any of the high intensity light modules 100 fail. Thus, the serviceability of the high intensity light 700 in the field is improved due to the modular design.

FIGS. 11 and 12 illustrate example dimensions of one embodiment of the high intensity light module 100. FIG. 11 illustrates a top or bottom view of the high intensity light module 100 and FIG. 12 illustrates a side view of the high intensity light module 100.

As discussed above, the high intensity light module 100 is designed to have a low profile to reduce the overall weight and wind loading. In addition, the high intensity light module 100 is designed to have a very long length relative to the width. For example, the ratio of the length to the width may be at least approximately three to one. In one embodiment, as illustrated in FIGS. 11 and 12, the high intensity light module 100 may be approximately 35.3 inches long and approximately 8.000 inches wide and has a profile or height of approximately 3.125 inches. This is only one example of possible dimensions for the high intensity light module 100 and should not be considered limiting. As noted above, the dimensions may vary depending on the required light output of a particular application or as the efficiency of the individual LEDs improve.

Figure 13:
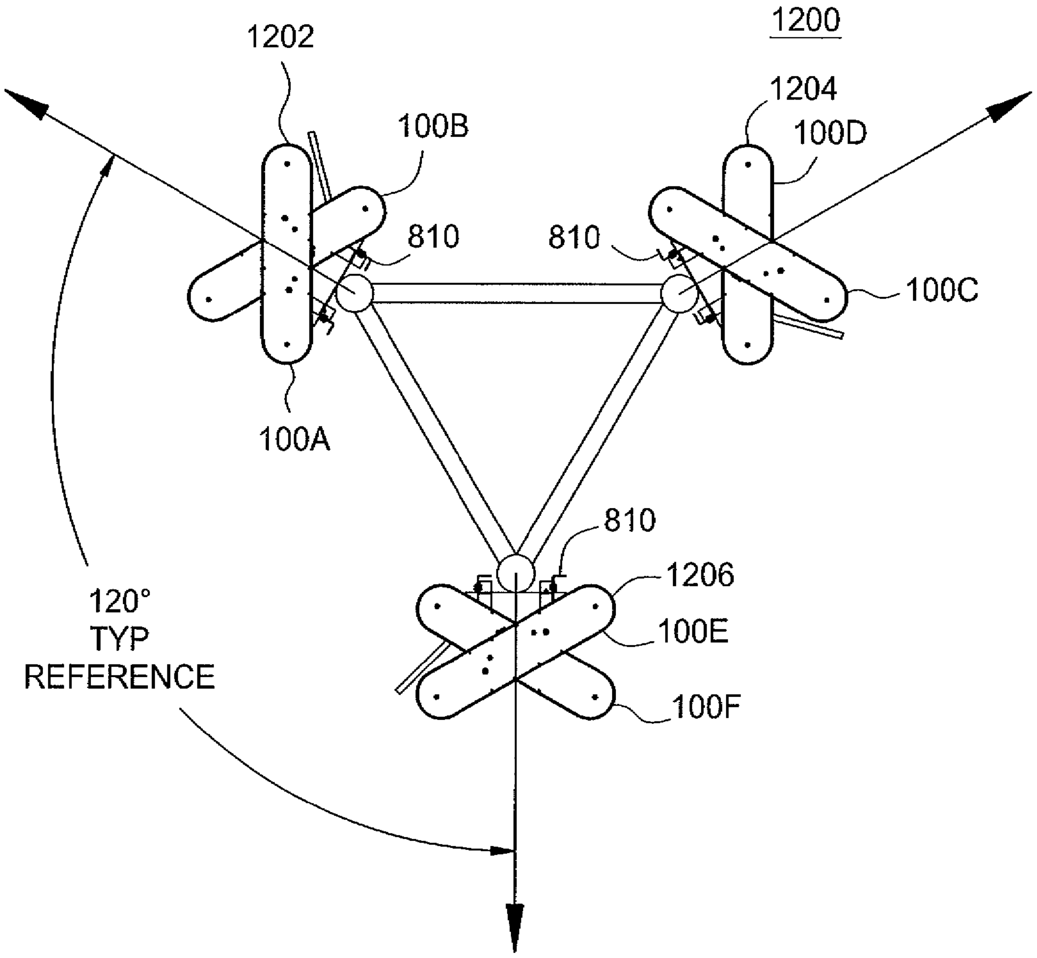
FIG. 13 depicts a top view of a high intensity light system.

FIG. 13 illustrates a top view of one embodiment of a high intensity light system 1200. In one embodiment, the high intensity light system 1200 includes a plurality of high intensity lights 1202, 1204 and 1206. In one embodiment, the high intensity light system 1200 includes three high intensity lights 1202, 1204 and 1206. This may be preferred when deployed on a tower that has three legs. In a further embodiment, the high intensity light system 1200 includes four high intensity lights. However, the number of high intensity light modules 100 and the angles that they are arranged at may be different.

The advantage of the modular design can be further appreciated when considering towers with three legs or four legs. To illustrate, the same number of high intensity light modules 100 can be used on a tower with four legs as a tower with three legs. The tower with four legs would require the same number of high intensity light modules 100. The high intensity light modules 100 would be mounted at different angles on the tower with four legs compared to the tower with three legs. For example, the tower with three legs would need four modules per leg for a total of twelve modules. The tower with four legs would need three modules per leg for a total of twelve modules as well.

In contrast, a non-modular design requires three lights for a tower with three legs but would normally require a fourth light when used on a tower with four legs. As a result, by using a non-modular design, the tower with four legs would have a much higher cost and excessive light output due to the additional fourth light. The module design of the present disclosure maintains an equal light output for towers with three legs and towers with four legs.

In one embodiment, the high intensity lights 1202, 1204 and 1206 each comprises a plurality of high intensity light modules 100A and 1008, 100C and 100D and 100E and 100F, respectively. Each one of the high intensity lights 1202, 1204 and 1206 is similar to the high intensity light 700 discussed above and illustrated by in example in FIGS. 8-10. Each one of the high intensity light modules 100A-100F is similar to the high intensity light module 100 discussed above an illustrated by example in FIGS. 2-6.

In one embodiment, the high intensity lights 1202, 1204 and 1206 are arranged such that they achieve a full coverage in a 360 degree radially outward direction with a consistent light output in all directions of the 360 degrees. In other words, unlike prior designs or designs using a Xenon bulb where there is no light emitted at higher horizontal angles, e.g., −90 to −120 degrees and +90 to +120 degrees, the embodiments of the high intensity light system 1200 of the present disclosure provide full consistent light output at all directions of the 360 degree radially outward direction.

FIG. 13 also illustrates how the mounting bracket 810 is mounted to the poles and to the high intensity lights 1202, 1204 and 1206. As can be seen in FIG. 13, each high intensity light module 100A-100F is designed to emit light out of a single side to reduce waste. For example, if a light module were designed to emit light in all directions, half of the light emitted by the light module may be blocked by the tower and wasted. As a result, the design of the high intensity light modules 100A-100F also provides an efficient use of all of the outputted light.

FIG. 1 illustrates an isometric view of one embodiment of the high intensity light system 1200. FIG. 1 illustrates the use of a remote power supply 1302 for each one of the high intensity lights 1202, 1204 and 1206. In one embodiment, each one of the high intensity lights 1202, 1204 and 1206 may have their own remote power supply 1302 or each one of the high intensity lights 1202, 1204 and 1206 may be coupled to a common, or single, remote power supply 1302.

In one embodiment, the remote power supply 1302 may include various electrical components such as a communication board or other necessary circuit boards. The remote power supply 1302 may operate using alternating current (AC) or a direct current (DC).

In one embodiment, each one of the high intensity light modules 100A-100F may be separately wired to a respective remote power supply 1302 via the strain relief opening 116. In one embodiment, each high intensity light module of a high intensity light (e.g., the high intensity light modules 100A and 100B of the high intensity light 1202) may be wired to a common remote power supply 1302 of the high intensity light (e.g., as illustrated by example in FIG. 1). In one embodiment, all of the high intensity light modules 100A-100F may be wired to a single common remote power supply 1302.

Having certain power supply components inside the high intensity light modules 100A-100F may offer benefits such as enhanced lightning protection, improved radio frequency (RF) immunity, reducing the amount of space required in a remote power supply 1302, and not being easily accessible. In addition, reducing the distance between the LEDs 112 and certain power supply components may reduce the voltage potential during a lightning strike. Making certain components, such as those that will be less likely to require maintenance, less accessible may reduce the likelihood of damage from when other components are serviced. Also, the components would not be exposed to rain or moisture when the other components are serviced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A high intensity light for warning aircraft of obstructions, comprising:

a first high intensity light module comprising a first plurality of light emitting diodes (LEDs); and a second high intensity light module comprising a second plurality of LEDs, wherein the second high intensity light module is stacked on top of the first high intensity light module, wherein a first optical axis of the first high intensity light module and a second optical axis of the second high intensity light module are angled to provide light emission at angles greater −90 degrees to +90 degrees in a horizontal axis, wherein the first high intensity light module and the second high intensity light module are parallel, wherein the first high intensity light module is coupled to the second high intensity light module via one or more openings of a top plate of the first high intensity light module and one or more openings on a bottom plate of the second high intensity light module.

2. The high intensity light of claim 1, wherein the first optical axis and the second optical axis form an angle in a range of approximately 20 degrees to 80 degrees.

3. The high intensity light of claim 1, wherein each of the first high intensity light module and the second high intensity light module comprises:

a first plate;

at least one reflector coupled to the first plate along a length of the first plate;

a plurality of LEDs coupled to the first plate, wherein the at least one reflector redirects light emitted by the plurality of LEDs substantially along a single side of the high intensity light module;

a lens coupled around a perimeter of the first plate; and a second plate coupled to the lens around a perimeter of the second plate and coupled to the first plate via one or more standoffs.

4. The high intensity light of claim 3, wherein the first plate and the second plate are substantially flat and substantially parallel.

5. The high intensity light of claim 1, wherein the first high intensity light module and the second high intensity light module are parallel to within 1 degree.

6. A high intensity light system for warning aircraft of obstructions, comprising:

a first high intensity light; and at least a second high intensity light positioned relative to the first high intensity light to provide 360 degrees of total light output, wherein each one of the first high intensity light and the second high intensity light comprises a first high intensity light module and a second high intensity light module stacked on top of one another, wherein a first optical axis of the first high intensity light module and a second optical axis of the second high intensity light module are angled to provide light emission at angles greater −90 degrees to +90 degrees in a horizontal axis, wherein the first high intensity light module and the second high intensity light module are parallel, wherein each of the first high intensity light module and the second high intensity light module of each one of the first high intensity light, the second high intensity light and the third high intensity light comprises:

a first plate;

at least one reflector coupled to the first plate along a length of the first plate;

a plurality of LEDs coupled to the first plate, wherein the at least one reflector redirects light emitted by the plurality of LEDs substantially along a single side of the high intensity light module;

a lens coupled around a perimeter of the first plate; and a second plate coupled to the lens around a perimeter of the second plate and coupled to the first plate via one or more standoffs.

7. The high intensity light system of claim 6, wherein the first high intensity light module and the second high intensity light module are parallel to within 1 degree.

8. The high intensity light system of claim 6, wherein the high intensity light system provides an approximately uniform amount of light output in all directions of the 360 degrees of total light output.

9. A high intensity light for warning aircraft of obstructions, comprising:

a first high intensity light module comprising a first plurality of light emitting diodes (LEDs); and a second high intensity light module comprising a second plurality of LEDs, wherein the second high intensity light module is stacked on top of the first high intensity light module, wherein a first optical axis of the first high intensity light module and a second optical axis of the second high intensity light module are angled to provide light emission at angles greater −90 degrees to +90 degrees in a horizontal axis, wherein the first high intensity light module and the second high intensity light module are parallel, wherein each of the first high intensity light module and the second high intensity light module comprises:

a first plate;

at least one reflector coupled to the first plate along a length of the first plate;

a plurality of LEDs coupled to the first plate, wherein the at least one reflector redirects light emitted by the plurality of LEDs substantially along a single side of the high intensity light module;

a lens coupled around a perimeter of the first plate; and a second plate coupled to the lens around a perimeter of the second plate and coupled to the first plate via one or more standoffs.

10. The high intensity light of claim 9, wherein the first plate and the second plate are substantially flat and substantially parallel.

* * * * *

UNITED STATES PATENT AND TRADEMARK OFFICE

CERTIFICATE OF CORRECTION

PATENT NO. : 8,801,241 B2
APPLICATION NO. : 13/440427
DATED : August 12, 2014
INVENTOR(S) : John Patrick Peck and Sam Acacia It is certified that error appears in the above-identified patent and that said Letters Patent is hereby corrected as shown below:

Specification

Column 11, line 6, delete “1008,” and insert -- 100B, --, therefor.

Signed and Sealed this
Eighth Day of December, 2015

Michelle K. Lee
*Director of the United States Patent and Trademark Office*